United States Patent
Marseillán

[11] 3,972,307
[45] Aug. 3, 1976

[54] MOVABLE FENCE TO CONTROL CATTLE PASTURAGE

[76] Inventor: Jorge Marseillán, Sarmunto 440, Buenos Aires, Argentina

[22] Filed: Oct. 18, 1974

[21] Appl. No.: 516,081

[30] Foreign Application Priority Data
Oct. 25, 1973  Argentina .................. 250712

[52] U.S. Cl. ............................ 119/20; 119/51 R
[51] Int. Cl.² ........................................ A01K 3/00
[58] Field of Search ............ 256/24; 119/16, 20, 119/51 R

[56] References Cited
UNITED STATES PATENTS
1,433,777  10/1922  Brown ............................ 119/16
3,620,192  11/1971  Taylor et al. ................... 119/16

Primary Examiner—Hugh R. Chamblee
Attorney, Agent, or Firm—Fitzpatrick, Cella, Harper & Scinto

[57]  ABSTRACT

Movable fence for pasturage control comprises a plurality of contiguous fence sections with transverse displacement means contacting the ground, means connecting contiguous sections, means forming an opening in each section to permit passage of the head of an animal therethrough and pushing means for allowing fence displacement.

9 Claims, 19 Drawing Figures

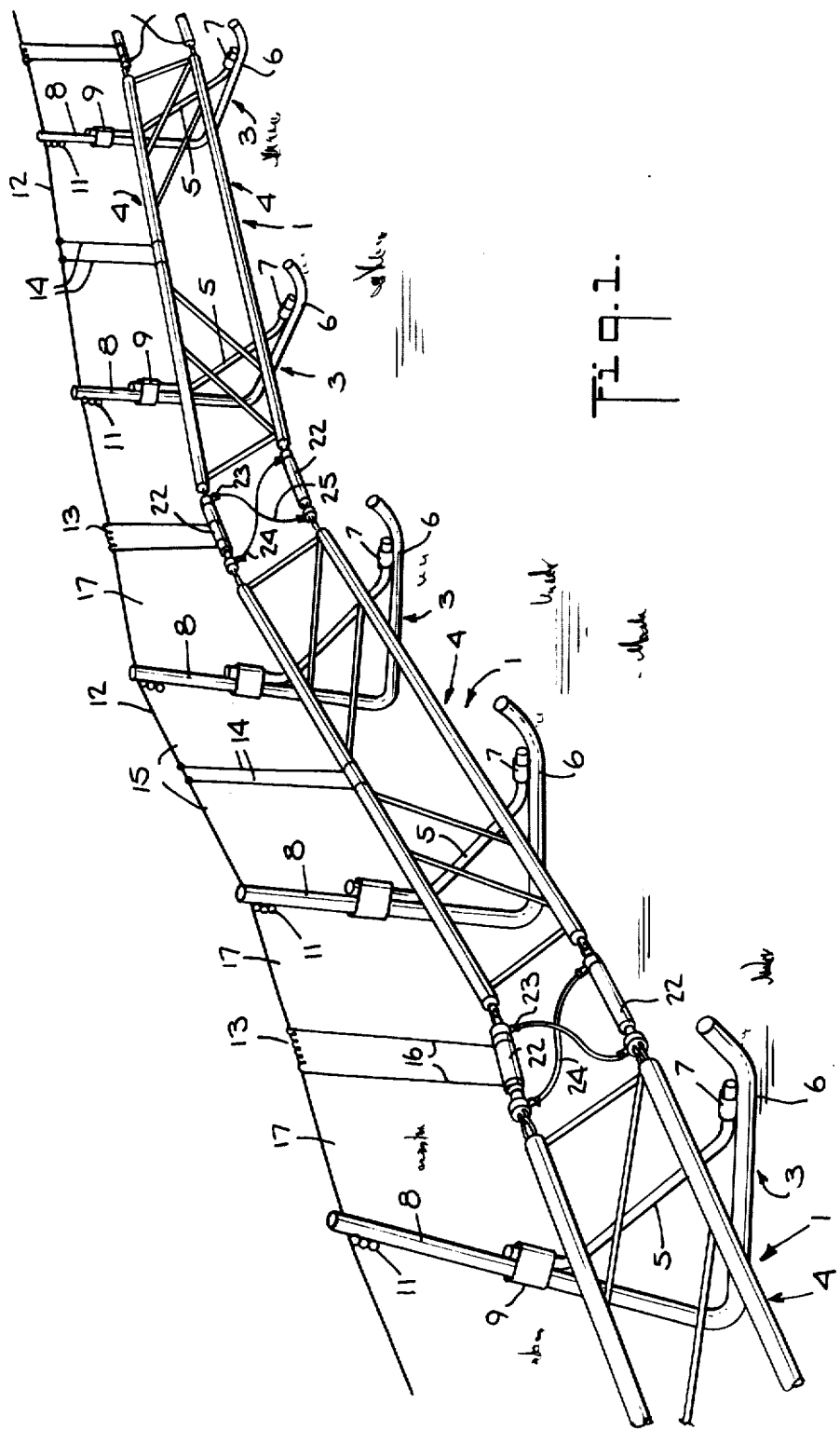

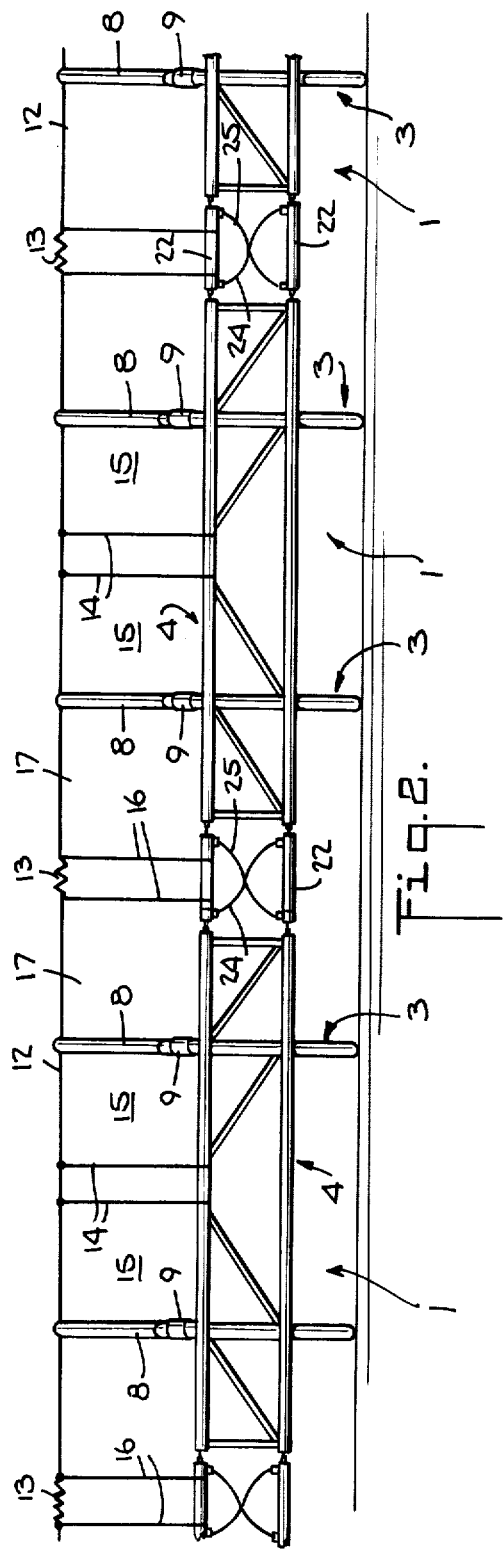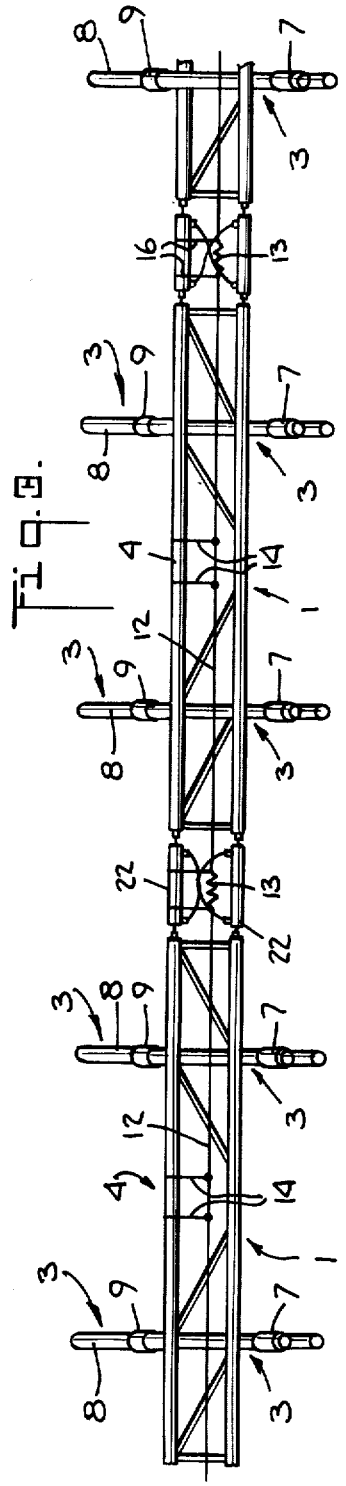

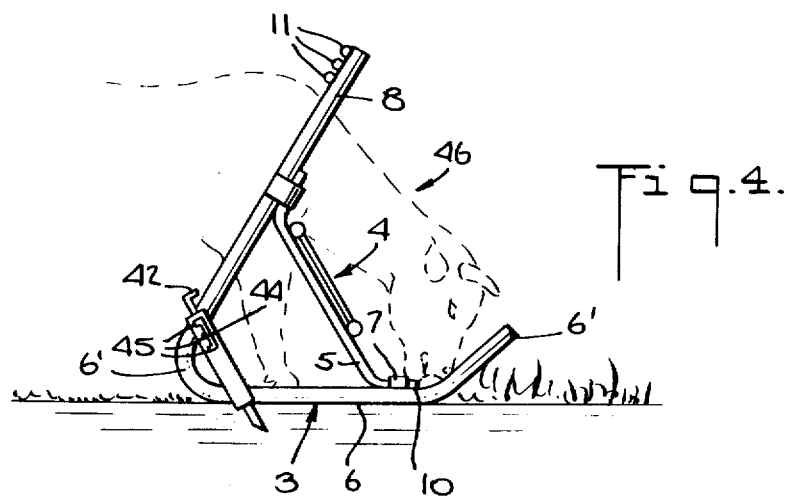
Fig. 4.
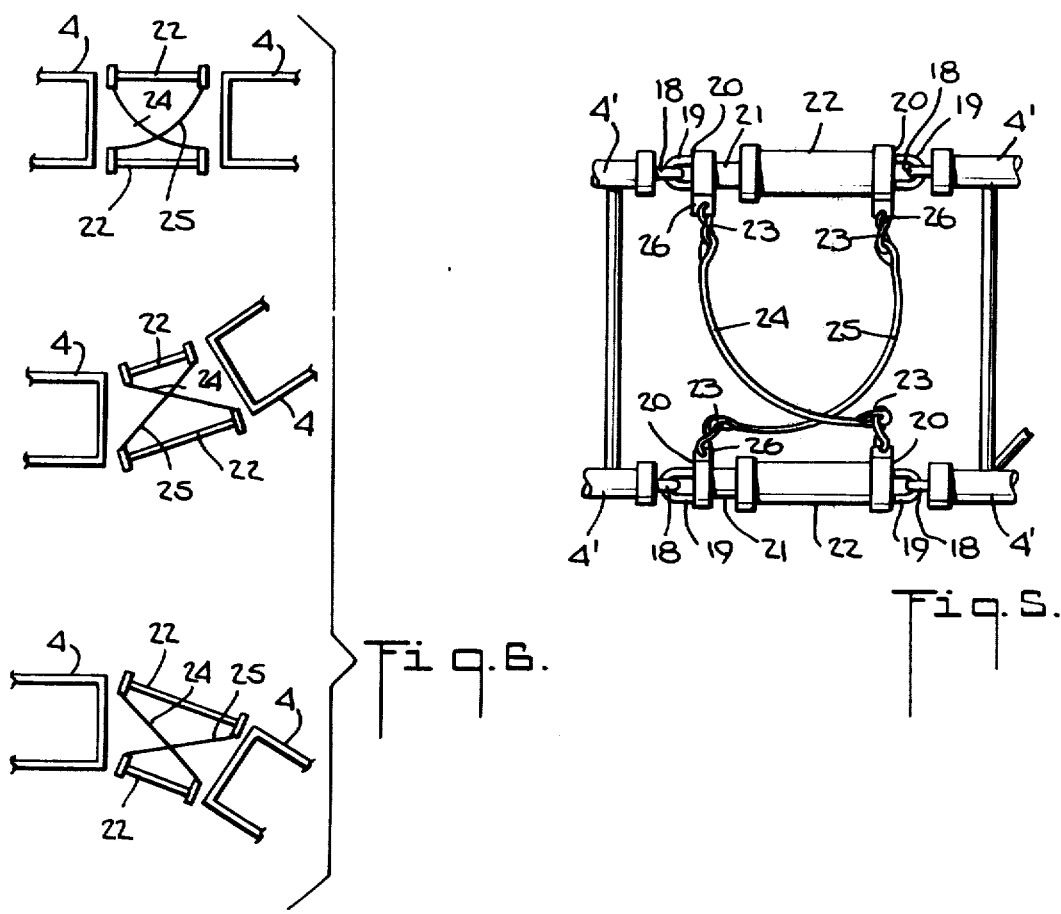
Fig. 5.
Fig. 6.

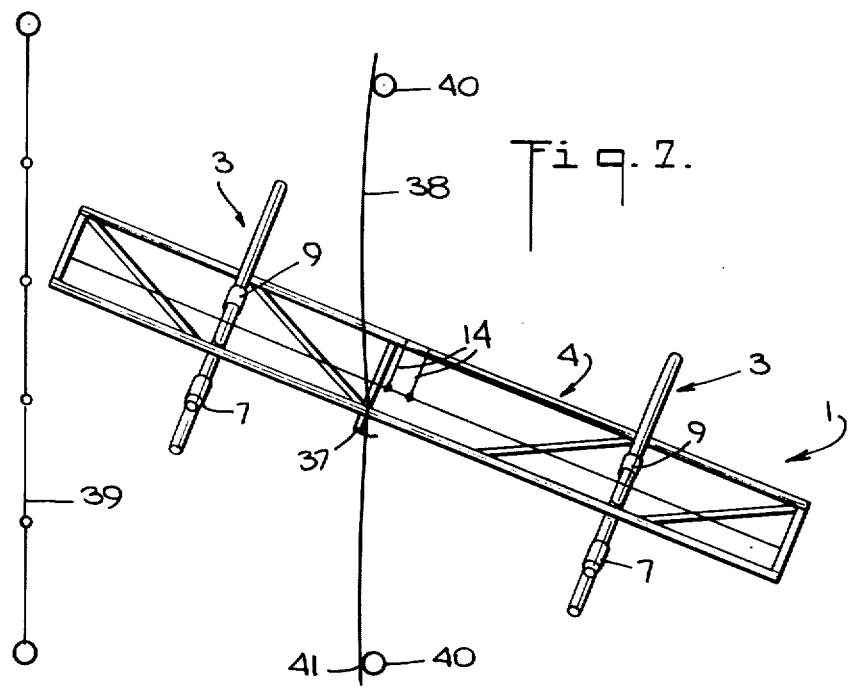
Fig. 7.
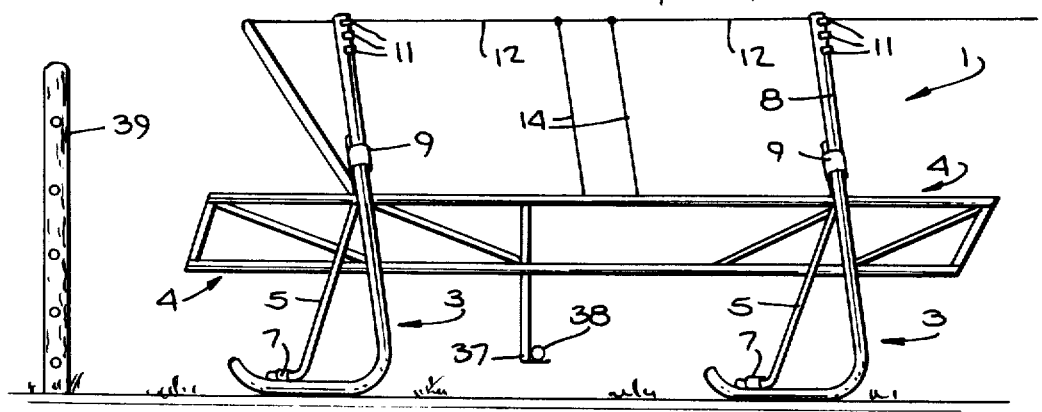
Fig. 8.
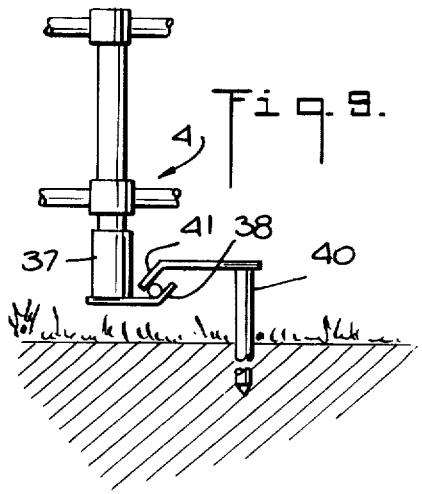
Fig. 9.
Fig. 10.

MOVABLE FENCE TO CONTROL CATTLE PASTURAGE

The present invention refers to a movable fence to control cattle pasturage.

Feeding techniques for cattle have lately been modified in order to feed more animals on the same ground areas. From free pastures on big natural prairies, the new system changed to small subdivided artificial meadows. By cattle rotation in different ground areas and by growth control of herbage, a better yield per acre was obtained.

But while this system allows more heads per acre to be fed by protection of the grass in its growing state, it does not prevent cattle trampling and polluting the grasses of the field, on which they are actually fed, calculating that the real yield of pasture grounds in this condition can drop to only 25 percent of the theoretical output.

For these reasons nowadays a new nursing system "in enclosed corrals" is being widely adopted, where cattle is raised in small yards. Herbage is daily out in a cultivated field and fed in the yard after its eventual mixing with other nutritive elements.

This use of enclosed corrals offers the advantage of not producing any waste of herbage by treading and defecations. Besides, it allows a correct control of daily feeding rations, without the inconveniences of direct pasturages, and the nightly routine of driving the cattle to the corrals. Among the inconveniences of this system I may mention the necessary existence of tractors and transport facilities to the corral with the corresponding and expensive labor required. This system furthermore requires feed depots for those days on which weather prevents transport and mowing activities.

Another inconvenience is the withdrawing of animal evacuations which is a costly job with the eventuality of bringing up pollution problems.

With the new cattle pasture movable control fence, substantially higher yields are obtained than those obtainable by any of the formerly mentioned procedures and with significant savings.

A fundamental characteristic of the present invention, constituting the object of the present patent, consists in a plurality of fence sections with transverse displacement means on the ground and connection means at the extremes of contiguous sections, each section having at least one opening able to allow the passing of the animals heads and a pushing frame corresponding to the mentioned opening, comprising means for fence displacement adjustments.

The above mentioned openings can be located above or below the pushing frame. In the case of openings above the pushing frame in actual verifications, a movable fence of the above mentioned type was transversely placed in one extreme end of a field, with cattle enclosed therein. It was immediately observed, that the animals passed their heads through the fence's openings, grazing on the herbage existing on the other side of the fence. Once finished grazing the accessible grass, it was observed that the animals moved the fence forward by pushing with their chests against the pushing frame disposed under each opening, provoking a gradual displacement of the movable fence in traverse direction of the same, to get access to the herbage existing in the immediate zones ahead.

When the openings are located below the pushing frame, the fence displacement is due to the cattle exerting pressure with their heads or necks against the pushing frame. In this case the opening can be formed between the pushing frame or bar and the ground on which it moves.

According to practical verifications, the movable fence for controlling cattle pasturage presents the following advantages:

As the animals remain on the ground sector where they graze all the existing herbage emerging from the soil, grass destruction by treading and evacuations is avoided. These excrements get concentrated in the ground, with an acceleration of its decomposition before grass begins to grow again, which increases its benefitial action over the ground.

The greenness is exploited to its maximum, because the animal feeds on all the existing grass within its reach before going ahead. The proximity of the head of a neighbouring animal provokes a decisive influence on the velocity of grazing of cattle which feeds then on herbages which otherwise would be depreciated. After the fences are pushed forward by the cattle, only non feedable weeds remain on the ground, easily facilitating its ulterior extirpation.

Furthermore herbage is cut by the animal to the level of best yield.

The new movable fence also allows adjustment of feeding time. Furnishing the movable fence with displacement regulation means constituted by a plurality of adjustable bolts with their extremities able to be introduced into the ground, it will be enough to lower sufficiently these bolts to the ground in order to create a higher resistance to the displacement of the fence or it may be totally anchored when desired. In this manner feeding is restricted to the ration needed by the animal, without moving the cattle.

The movable fence transforms itself into a pasture dosage feeder, which permits daily feeding measurements.

Other means of regulating fence displacements, as we will see later on, avoid the formation by two contiguous sections of a reciprocal angle inferior to a pre-determined value.

It has to be emphasized, that, the new fence operates in any wheather and ground condition, eliminating thus the inconveniences which so often occur to the corral feeding system. The new fence's integrating sections are easily installed and easily removed and dismounted, simplifying transportation from one field to the other.

The cost of this fence may be higher than the price of an ordinary wire fence, but that is not important or significant in view of the higher meat output obtainable on the same acreage basis.

Besides, by changing the height of the pushing frame, I can adapt it to the average height of the cattle so that the animal could exert comfortably an optimum pressure against the fence.

Practice proved, with this new fence, that grass is cut off completely in a short time, which accelerates —as it is known— its rapid recuperation, particularly when considering, that herbage cut off by an animal according to reputed opinions, grows faster. This constitutes a complementary advantage over the corral feeding method with its mechanical cutting.

The new pasturage movable controlling fence allows leasing of the pasture grounds on grass consumption terms only, and not as actually negotiated per animal and time. Thus, an exact rent price is easily established, adding a possible partial exploitation of the field.

The fence structure allows to locate in it detachable feeding troughs for complementary grain rations in addition to the green fodder.

To facilitate fence displacements, an improved version consists in providing both ends of each fence with skidding and joining means, these later being mounted on its respective guides contigous to the two longitudinal wire fence sides of the field. Therefore in a preferred practical construction there exist a plurality of stakes driven in the ground in adecuate distances with a skidding shoe on their superior ends, serving as support of a guiding cable in short distance and parallel to the original wire fence.

On the extreme ends of the movable fence, corresponding pieces are hooked on the respective guide cables. In this manner the extremes of the movable fence are displacing themselves parallel and alongside the guide cables, without separating from them by action of the above pieces on the guide rope.

The use of cables or chains of a shorter length which can be advanced as the movable fence is pushed ahead, with the addition of retention means is also possible.

Another complementary characteristic of the new movable fence consists in providing to the reciprocal union means of the contiguous extremes of its constitutive sectors, a device which prevents that the longitudinal axis of two contiguous sectors from forming smaller angles or higher reciprocal parallel displacements than precalculated values. This improvement responds to a practical observation which shows that transverse displacements along the pasture ground are realized with more regularity when the relative movements are limited.

Practice proved furthermore that in the movable fence can be installed sowing or fertilizer irrigating devices, operated by a cog-wheel which, rolling on the ground, governs seed distribution or fertilizer irrigation. Complementary advantage of this new system consists in the fact, that the movable fence while transversally displacing along the field, automatically realizes seeding and fertilizing-irrigation operations.

Other invention characteristics, constructive details and advantages may be appreciated by the drawings, accompanying the present description and claims which present some of the preferred realization forms of the fundamental idea, which —as is logical— could be diversified. We refer herewith to the drawings in order to broaden the related concepts and to demonstrate the invention practicability:

FIG. 1 shows in partial perspective a movable fence, constructed according to the present invention.

FIGS. 2 and 3 represent the fence of FIG. 1 in front and top view, showing one of the preferred forms of reciprocal union between contiguous fence sectors.

FIG. 4 represents a side view of one of the movable fence constitutive sectors (illustrated in the previous drawings) showing the relative cattle grazing position.

FIG. 5 shows in detail reciprocal connection between two adjacent fence sections, illustrated in FIGS. 1 to 3.

FIG. 6 demonstrates reciprocal connection operation by limiting angle between sectors as illustrated in FIG. 5.

FIG. 7 shows how one movable fence extreme is displaced, following the guide rope without separating from the original wire fence.

FIG. 8 is a front view of the same object, shown in FIG. 9.

FIGS. 9 and 10 illustrate in more detail by side and top views, guide rope and displacing guide shoe with supports and forked part, (tubular idem) which displaces itself by the guide rope in on-hooked position.

Figure 11:
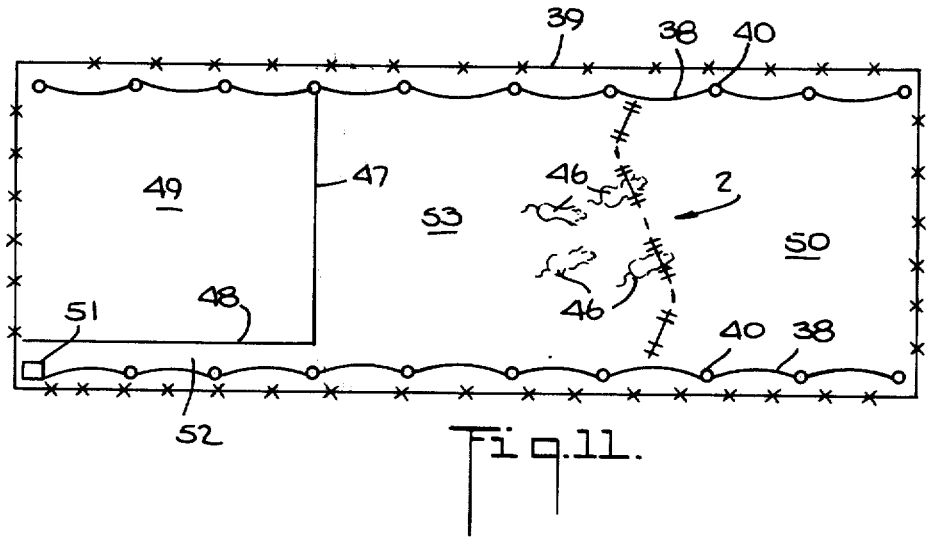

FIG. 11 are a pasture field in top view, where cattle is grazing, utilizing pasturage control movable fence in one of its possible forms.

Figure 12:
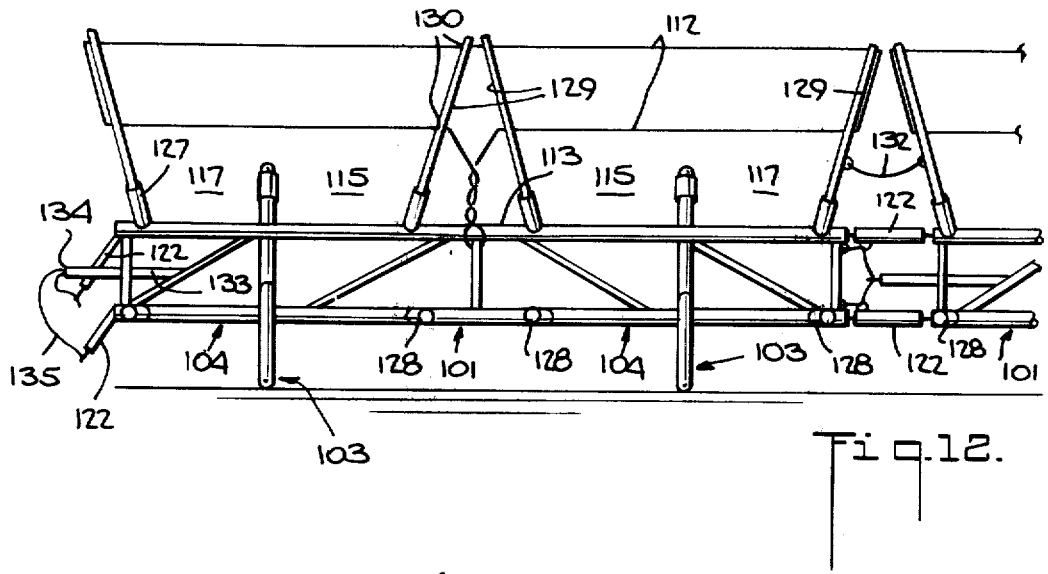

FIG. 12 shows a front partial view of another construction of the movable fence, which also has its openings above the pushing frame.

Figure 13:
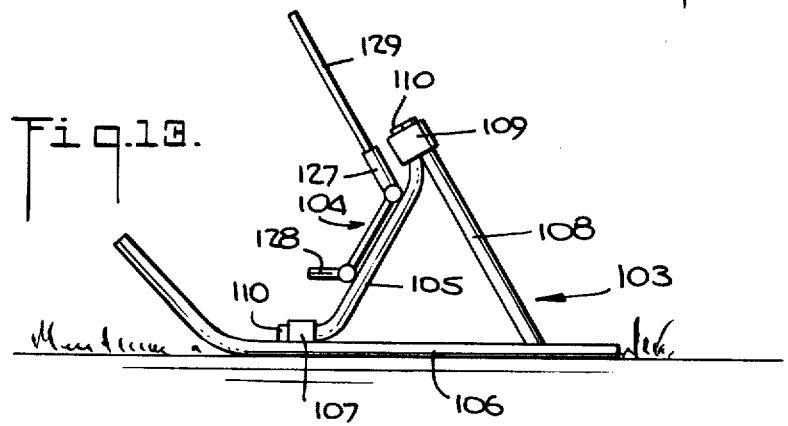

FIG. 13 is a section view of one of the sectors of the movable fence of FIG. 12.

Figure 14:
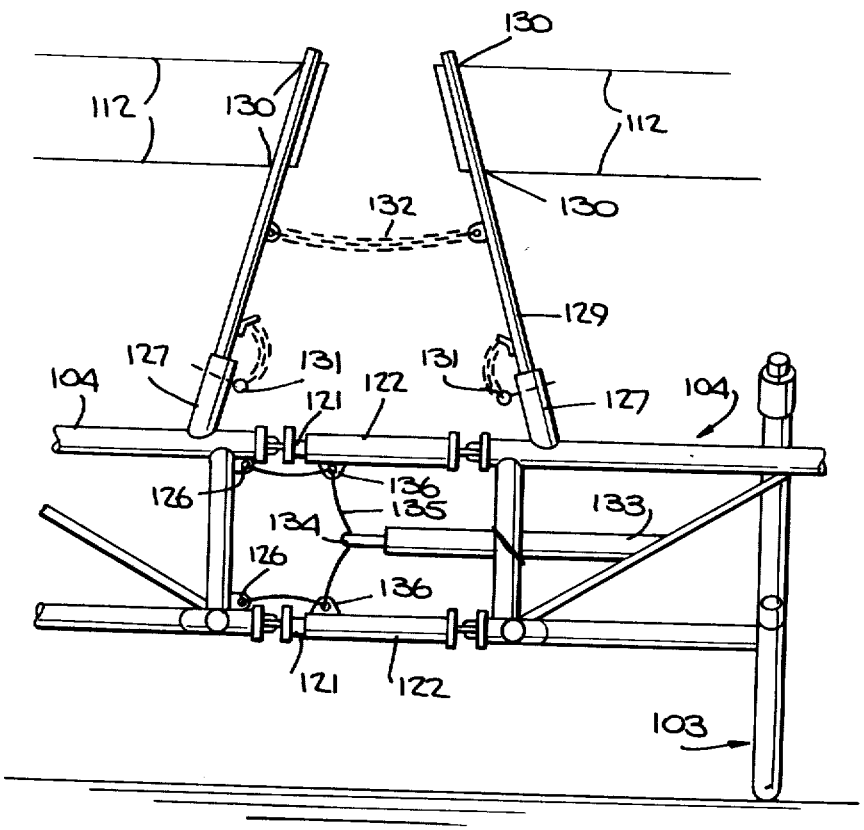

FIG. 14 illustrates with more detail, the joining means of the sections of the fence of FIGS. 12 and 13, these means differing from the ones shown in FIGS. 1 to 6.

Figure 15:
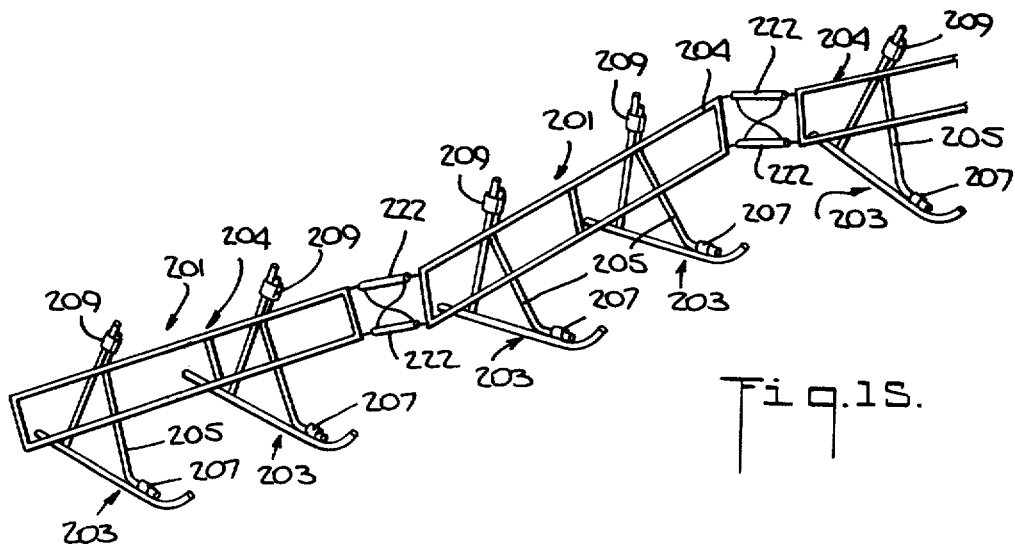

FIG. 15 is a partial perspective of another construction of the movable fence, this time with openings below the pushing means.

Figure 16:
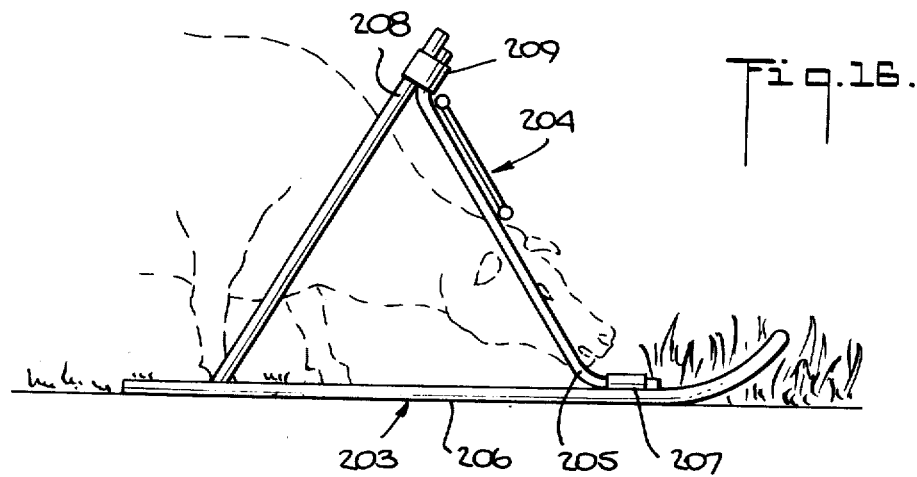

FIG. 16 shows a section of one of the sectors of the fence described in FIG. 15 showing the relative cattle grazing position.

Figure 17:
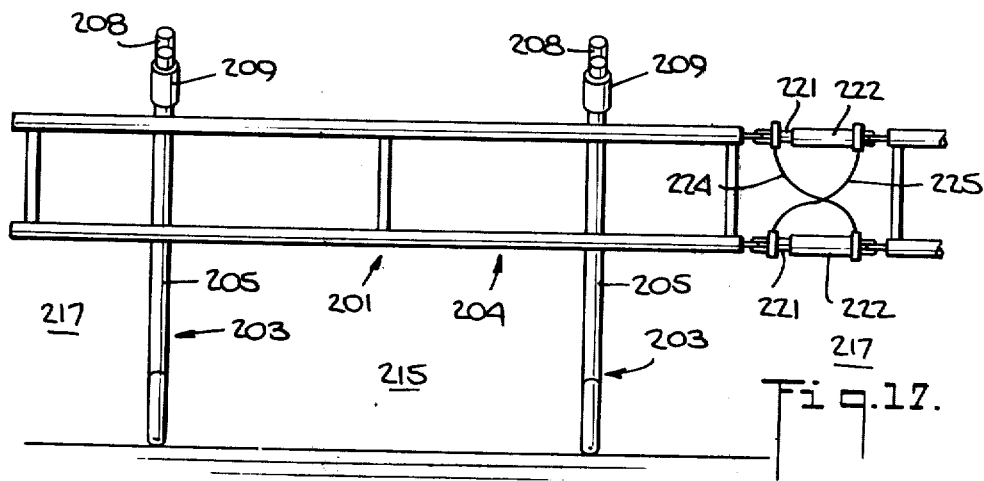

FIG. 17 is a front partial view of the fence illustrated in the two preceding figures.

Figure 18:
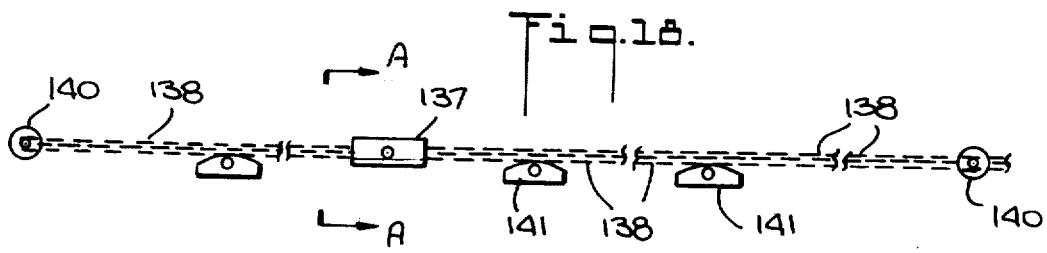

FIG. 18 shows a partial plan of another construction of the fence's guiding means.

Figure 19:
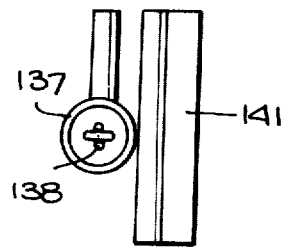

FIG. 19 corresponds to the section A—A of the guiding means of FIG. 18.

In the following description numbers are used to identify different parts of the whole, but the same numbers (even in other figures) will identify the same or equivalent elements.

In FIGS. 1 to 6, sections 1 which integrate fence 2, are conformed by two pieces 3 forming angle with an arc to slide by, and a rectangular frame 4, provided with two fastening rods 5.

The inferior arm 6 of parts 3 constitutes a sort of skidding shoe on the ground by its curved extremes, 6' and a welded sleeve 7. The other arm 8 is inclined and guides a sliding tubular part 9 which has an 8-shaped section. Frame 4 is welded, at a certain distance of its ends 4', to respective fastening rods 5, partially bent on its ends 10. Structure 1 is assembled, introducing one of the bent ends 10 into fixed bush 7, sliding downward part 9 to introduce in it the other end 10. As bent parts 10 are equivalent, they could be inverted and as frame 4 is welded to rods 5 in a displaced eccentric position, reversing of parts 10 changes height of the superior edge of the frame 4. This inversion allows the adjusting of the pushing supports to the animals height.

The superior extension of arm 8, belonging to part 3 has a plurality of hooks 11, through which a wire 12 is passed, selecting the elevation of hooks 11 according to the animals height. Wires 12 of each section 1 are united between themselves by spring 13.

Wires 14, starting from wires 12 and fixed to the superior edges of frames 4 form a pair of central apertures 15, which remain in this way above the pushing frame constituted by the superior edges of frame 4. Another couple of vertical wires 16 in the sector of springs 13 conform respective extreme apertures 17 in each section 1.

The ends of the frame 4 of each fence section 1 have two perforated and welded ears 18 in which other perforated ears 19 are hooked and fixed in the bottom 20 of tubular pieces 21 and 22 of different diameters.

Each section 1 supports parts 21 on one of its ends and parts 22 on the other. To obtain reciprocal vinculation of two contiguous sections 1, parts 21 and 22 are telescoped and extreme hooks 23 of respective tension members 24 and 25 are diagonally hooked into perforated ears 26 of parts 21 and 22.

By this form of reciprocal connection and by the inclined position of frames 4 (FIG. 4), both tension members 24 and 25 remain in distended position, when sections 1 are (FIG. 6 and superior drawing) aligned. But when both sections are disaligned, forming an angle of less than 180° (see central and inferior drawing of FIG. 6), the diagonal of one of tension members 24 or 25 is lengthened to its utmost elongation and from this point on, the other diagonal is extended in the same way, restricting thus the angle, which the longitudinal axis of 2 contiguous sections would perform. Object of this disposition is to maintain a minimum degree of alignment by the entirety of sections 1 of movable fence 2 in order to improve displacement control of this fence.

Reciprocal connection of FIGS. 5 and 6 determines the dragging of at least one of the contiguous sections, when one of sections 1 is pushed forward a certain distance and eventually both adjacent sections when the first one is displaced perpendicularly to its axis.

Practice has proved, that with this arrangement, cattle tend to graze from one of fence sections 1 shifting it until the limit of transverse displacement is reached. As displacement from this point on becomes more difficult, because it demands now the drag of two contiguous sections, the cattle returns to graze at another section 1, the displacement of which is easier because it stayed behind.

In one of the invention's preferred forms, a forked member 37 is placed on the endsections 1 of the movable fence 2 (FIGS. 9 to 12) and hooked on guiding rope 38, arranged parallel and in short distance from the original wire fences 39 of the pasture field. Guiding rope 38 will be maintained at an adequate elevation, in the spots corresponding to a plurality of rods 40, planted into the ground with adequate spacing between themselves and with a sliding shoe 41 on their superior ends and a welded or bolted point on the inferior edge, corresponding to guiding rope 38. When the movable fence 2 is now displaced along the pasture field, the forked member 37 glides along guiding rope 38 and along the following sliding shoes 41. Sections 1, constituting extreme ends of fence 2, are unable to separate from the respective wirefence side 39, by action of hooks 37, holding on to rope 38.

Angular members 3 (FIG. 4) could be provided with a displaceable bolt 42, housed in guiding tubular piece 43 welded on member 3. Bolt 42, runs with lug 44 in a groove of tube 43, enabled to stay fixed in one of groove notches 45. According to the different bolt depths in the soil, the same adjust and restrict displacement of section 1 on the ground, producing eventually a complete stopping of movements, when the bolt is introduced completely to its maximum depth. FIG. 13 shows an entire installation of the movable fence in one of its preferred forms. This movable fence 2, consisting of a plurality of sections 1 is of the type, where section ends are withheld by guide ropes 38, hooking on the forked parts 37. The animals 46 will pass their heads through apertures 15 or 17 of section 1, finding access in this way to the herbage on the other side of fence 2. Having fed on the grass within their reach, they will push the fence forward by their chest, pressing against the superior edge of frame 4 (FIG. 4) and finding now a new portion of herbage, placed directly before them.

The movable fence will be displaced gradually by common action of all the animals, guided by guide ropes 38 contiguous to side wire fence 39. Velocity is adjustable by the action of bolts 42.

When presumed, that the animals have sufficiently grazed, their next access to the herbage can be inhibited or completely blocked, by pushing bolts 42 profoundly into the ground, to their final extreme position. Two electrified wires 47 and 48 obstruct access to zone 49 of field 50, protecting new growth of herbage in this sector 49. Nevertheless, cattle will have access to watering troughs 51 by narrow passage 52. Periodically in the terms that the pasture takes to grow again, electrified wires 47 and 48 will be advanced, covering zone 49 being each time more extended, according to fence displacement along the pasture field. In this manner, cattle occupies only sector 53 of the entire pasture field, limited by fence 2, wires 47 and 48 and side wire fence 39, where cattle treading and defecating cause no damage because the grass has been recently cut off.

In the construction shown in FIGS. 12 to 14, sections 101 are formed by two pieces 106 and 108 welded one to the other forming an angular element 103 equivalent to the already shown member 3.

The bars 105 with bent ends 110 and the frame 104 welded to the former are similar to the first example shown as well as its reciprocal joining means 107 and 109.

But a difference of this example shows that over the frame 104 there are welded four pairs of tubular bases 127 and 128 in an inclined position. In the four top tubular bases are plugged corresponding bolts 129 through whose perforations 130 there is a cable 112 with its extremes hooked on 113 developing in this way openings 115 and 117 equivalent to the openings shown at 15 and 17.

The bolts 129 plugged into the tubular bases are locked by means of the pins 131 and corresponding chains 132 provided between the extreme bolts 129 of each two adjacent sections, prevent the possibility of an animal jumping through the corresponding opening.

In this realization we have the same tubular parts 121 and 122 of the first example, but the two tension bars 24 and 25 are eliminated. Instead, a bar 133 fixed to frame 104 with a perforated ear 134 holding the medium portion of a cable 135 whose ends, after penetrating the holes 136 provided in parts 122 are hooked in the hooks 126 of the adjacent frame 104.

This device accomplishes the same function as explained above for the tension bars 24 and 25 but with more precision, as is very well understood with some command of the art.

The example of FIGS. 15 to 17 is easily understandable after what we already seen and besides it is the simplest one.

Sections 201 are only formed by two angular elements 203, frame 204 and its two joining bars 205 as we saw, besides the sections joining device shown in FIGS. 5 and 6.

The basic difference between this case and the two former ones, lays on the fact that the frame 204 remains in a higher position with respect to the ground, in such a way that the openings 215 and 217, through which the cattle get to the grass, are formed between the inferior part of the frame 204 which is the pushing mean, and the ground.

The frames 204 being higher, are enough to avoid the jumping of the cattle over the movable fence.

The device shown in FIGS. 18 and 19 can substitute for the one shown in FIGS. 7 to 11.

Instead of the cables 38 which cover all the length of the field, corresponding chains 138 are being used but are substantially shorter. For example each 100 meters some bars 140 are forced into the ground with a bolt in their upper end. In between each two bars 140 every 20 meters for example some other retention bars 147 are grounded whose exterior respect to the longitudinal axis of the field is a curve. On the ends sections of the movable fence, instead of the hooks 37 a tubular part 137 is fastened which is longitudinally transversed by the chain 138. The ends of this chain, as the fence is advancing, are tensely locked between two adjoining bars 140 in order to have it resting alongside of the exterior curves of the retention bars.

When the movable fence gets to the end of the chain this latter is moved forward among the following two bars 140.

It may be made clear that the preceding description refers to some of the different invention forms as examples, without restriction but demonstrative, introducing different modifications of form, construction and detail without exceeding the invention's scopes, as clearly specified in the following claims.

I claim:

1. A movable fence for the control of cattle pasturage comprising; a plurality of fence sections each having transverse displacement means contacting the surface of the ground, connection means for connecting adjacent ends of said sections, each section having at least one opening adequate for the passage of the head of an animal therethrough and pushing means against which an animal may exert a pushing force, and displacement and hooking means at the end sections of the fence for connection with guiding means to guide fence movements.

2. Movable fence to control cattle pasturage, according to claim 1, characterized in that the openings of the fence sections are located above the corresponding pushing means.

3. Movable fence to control cattle pasturage, according to claim 1, characterized in that the openings of the fence sections are located below the corresponding pushing means.

4. Movable fence to control cattle pasturage, according to claim 3, characterized in that the openings are formed between the pushing frames and the ground on which it moves.

5. Movable fence to control cattle pasturage, according to claim 1, characterized in that guiding means constituted by a plurality of rods fastened to the ground at convenient locations each with a sliding shoe on its superior end are provided to support a guiding rope extending parallel to and closely spaced from a wire fence, while corresponding forked members are provided on the fence and sections for engagement with the respective guide ropes.

6. Movable fence to control cattle pasturage, according to claim 1, characterized in that the contiguous ends of said connection means are equipped with transverse displacement adjusting means for preventing the longitudinal axis of each contiguous section from forming an angle smaller than a pre-established value.

7. Movable fence to control cattle pasturage, according to claim 6, characterized in that said transver displacement adjustment means are constituted by a plurality of bolts located on the fence sections and whose inferior extremes can be driven into the ground to predetermined depths.

8. A movable fence according to claim 1, characterized in that each said section comprises a rectangular frame and at least two angular members one of the arms of each of which constitutes a sliding shoe, and a fastening rod corresponding to each shoe, the ends of said fastening rod being removably attached to a respective arm of said shoe and said fastening rods being fixed to said frame.

9. A movable fence for the control of cattle pasturage according to claim 1, wherein said connection means comprise telescoping means pivotally connected at the respective ends thereof to the ends of adjacent fence sections, and tension means for limiting the extension of said telescoping means to control relative displacement of adjacent fence sections.

* * * * *